United States Patent [19]
Witzke et al.

[11] 4,257,046
[45] Mar. 17, 1981

[54] SIMULTANEOUS COLOR AND BLEACH OF ECD

[75] Inventors: Horst Witzke, Princeton; James W. Pollock, New Egypt, both of N.J.

[73] Assignee: Refac Electronics Corporation, Barkhamsted, Conn.

[21] Appl. No.: 971,414

[22] Filed: Dec. 20, 1978

[51] Int. Cl.³ .............................................. G09F 9/00
[52] U.S. Cl. .................... 340/785; 340/701; 350/357
[58] Field of Search ......................... 340/785; 350/357

[56] References Cited

U.S. PATENT DOCUMENTS

| | | | |
|---|---|---|---|
| 3,987,433 | 10/1976 | Kennedy | 340/785 X |
| 4,096,412 | 6/1978 | Sekiya et al. | 340/785 X |
| 4,117,475 | 9/1978 | Ebihara et al. | 340/785 |

*Primary Examiner*—David L. Trafton
*Attorney, Agent, or Firm*—Prutzman, Kalb, Chilton & Alix

[57] ABSTRACT

Driving circuitry is disclosed for electrochromic displays, the driving circuits providing specific characteristics necessary for such displays. Particularly, apparatus is provided to minimize variations in the optical density and in the contrast between the various segments of a device. Further, simultaneous coloring and bleaching signals are provided to the display, thereby avoiding an undesired visual effect of unsynchronized formation for a character on a display device. The circuitry moreover includes components to prevent repeated energization of a segment in a display device. Additionally, circuitry is provided for generating bleach and color signals for the display. Additionally, a power supply for electrochromic displays, requiring bipolar outputs, is disclosed utilizing a single, unipolar, unregulated source therein.

11 Claims, 8 Drawing Figures

SIMULTANEOUS COLOR AND BLEACH OF ECD

BRIEF DESCRIPTION OF THE INVENTION

1. Field of the Invention

The present invention relates to electronic displays utilizing devices having plural display portions therein. More particularly, the disclosure teaches improved driving circuitry for such displays.

2. Background of the Invention

Prior art electronic display devices using LED's and LCD's are known. Such displays do not possess a variable contrast feature, and dissipate substantial amounts of power. Displays using electrochromic devices, however, such as described in U.S. Pat. No. 3,708,220 for example, require less power, and utilize bipolar power driving signals. Specifically, electrochromic displays have a "memory," and thus require both a color signal to activate a particular segment or portion of the display, and a bleach signal to deactivate the display portion, but do not require continuous energization of an activated segment. Drivers for displays utilizing such electrochromic displays are shown in U.S. Pat. Nos. 3,987,433 and 3,950,936. Because of the sensitivity of the electrochromic devices, and the variable contrast and optical density properties thereof, the potential across each of the colored segments must be identical for all segments, or a non-uniform density will result. Prior art devices do not provide for such regulated optical densities for displays, and if used would result in the objectionable variable contrast and density. Moreover, the use of bleach and color signals in an electrochromic display necessitates the synchronization of such signals in order to avoid a situation wherein a device displaying a first character is required to display a second character, and displays, for a period of time, portions of both characters.

SUMMARY OF THE INVENTION

It is a primary object of this invention to overcome the disadvantages of the prior art.

It is more particularly an object of the invention to provide simultaneous bleach and color signals to an electrochromic display.

Yet another object of the invention is to provide constant contrast display in an electrochromic device by providing a common potential across the various device segments or portions thereof.

Still another object of the invention is to avoid a situation wherein a color signal is provided to a segment of a display when the segment is already colored.

An additional object is to provide a power supply for an electrochromic display having therein a regulated color supply voltage.

Still another object of the invention is the provision of a bipolar power supply for an electrochromic display from a unipolar voltage source.

These and other objects and advantages of the present invention will become apparent upon reading the specification in conjunction with the appended drawings, wherein like numerals refer to like objects throughout the figures.

DETAILED DESCRIPTION OF A PREFERRED EMBODIMENT

The present invention provides for an electrochromic display in a driving circuitry having the advantages hereinabove enumerated.

Figure 1:
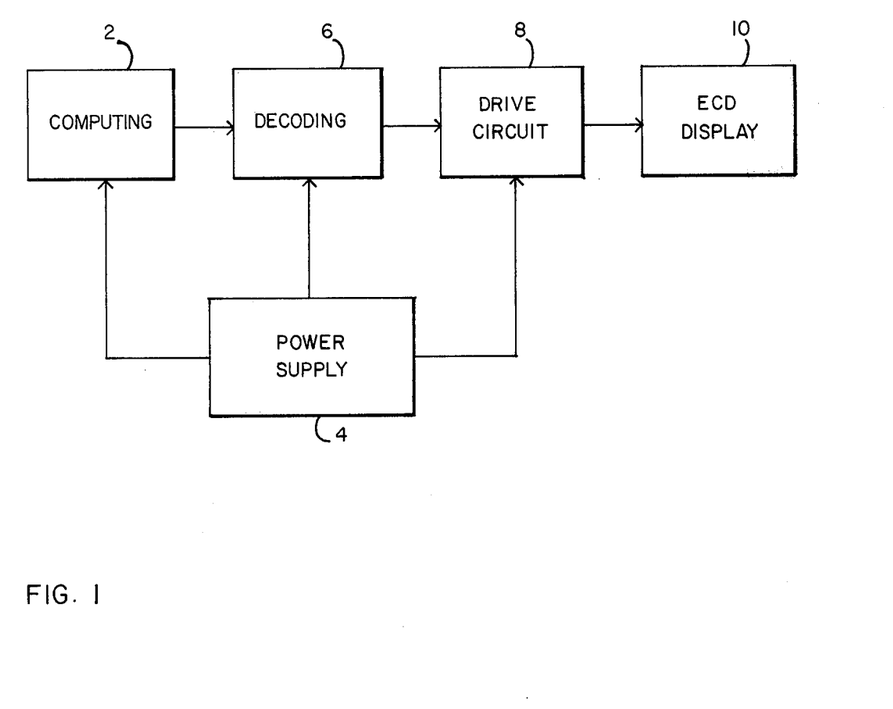
FIG. 1 shows in a block diagram a generalized form of an electrochromic display system.

Referring now to the figures for a better understanding of the inventive concept, FIG. 1 broadly shows a system utilizing an electrochromic display (ECD). Specifically, a particular item to be displayed is computed in block number 2. The computing apparatus receives its power from a power supply 4. The computed item is decoded to provide signals specifically suited for driving the particular display configuration. Thus, where a 5×7 display is used, the signals are decoded to be able to drive 35 display points. In a seven-segment display, decoding means 6 decodes the item computed in block 2 and provides seven output lines, each carrying information as to the segments required to be active in the display. Other display configurations may similarly be used, and it is understood that the invention is not limited to the above-discussed display configurations which are used for illustrative purposes only. Drive circuit 8 receives the decoded signals from block number 6 and acts effectively as an interface between the decoder and the display unit 10 in order to convert the voltage levels as decoded by element 6 to values usable for driving display 10. As shown in FIG. 1, supply 4 provides power to all the units utilized therein. It is, however, within the scope of the invention to provide a power source within each of the blocks, for powering any combination of the blocks.

Figure 2:
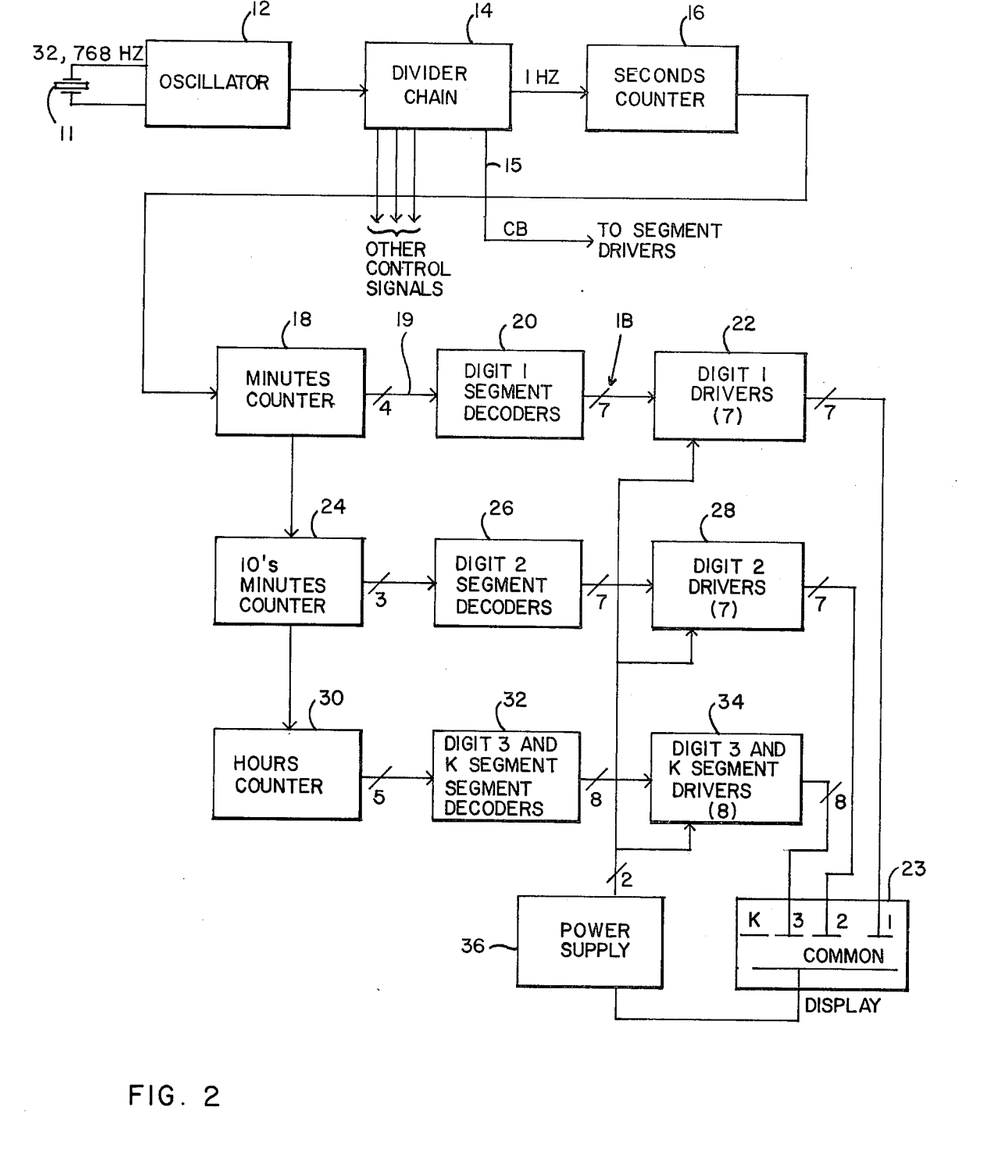
FIG. 2 illustrates a particular application of a display system incorporating therein the present invention.

Turning now to FIG. 2, illustrating a particular example of a display system utilizing the present invention, a block diagram is shown of a digital clock using an ECD. Generally, the design of such time display devices is known. See, for example, U.S. Pat. Nos. 3,820,108, 3,842,589 and 3,855,783, assigned to the assignee hereof. Particularly, such a display may include a quartz crystal oscillator comprising crystal 11 and oscillator 12 as shown, the oscillator providing a 32.768 kHz signal to a divider chain 14. Divider 14 is shown as providing several control signals in addition to a lead 15 carrying thereon a specific control signal CB. Divider 14 divides the 32.768 kHz signal down to a 1 Hz signal which is input to a seconds counter 16. Counter 16 provides a signal to a minutes counter 18 once every minute. Minutes counter 18 outputs a BCD signal on four lines 19 to a seven-segment decoder 20 for digit 1. Decoder 20 outputs seven lines, one per segment, to driver circuit 22 for digit 1. Driver 22, after providing the proper voltages responsive to the signal on the seven-segment lines, provides outputs on seven lines to digit 1 of display 23. The seven segments of the digit are appropriately selected by decoder 20 and driven by driver 22, responsive to the count in minutes counter 18. When counter 18 advances and has a transition from nine to zero, a signal is output therefrom to the ten-minute counter 24.

Counter 24 provides a BCD signal on three output lines, inasmuch as only the numbers zero through five need to be represented. A seven-segment decoder for digit 2 is shown at 26 as receiving the BCD signal from counter 24, and providing seven output lines to driver circuit 28 for digit 2. Driver 28 drives the segments of the second digit of display 23, similar to the driving of digit 1 by driver 22. On each transition of the 10 minute counter from five to zero, a signal is output to hours counter 30. Counter 30 outputs a five-bit BCD signal, in order to be capable of representing the numbers zero through 12. Representation of the hours number is by digits 3 and K of display 23, digit K representing the number 1 and digit 3 the digits zero through nine. Seven-segment decoders 32 provide eight output signals representative of the segments to be driven displaying the hours count. The eight signals are provided to the drivers for digits three and K numbered 34. The output of drivers 34 cause the activation of digits 3 and K. Power supply 36 is shown as providing power to the drivers and to the display.

With the exception of the drivers, this circuit essentially provides the same configuration currently used in liquid crystal and light emitting diode display digital clocks. Power supply 36 is shown as having two output lines therefrom, each of the two lines providing inputs to drivers 22, 28 and 34, in order to be able to drive an electrochromic display, which requires two opposite polarity signals therefor. Supply 36 thus provides bipolar output voltages. A connection is also shown from the power suply to the common electrode of the display. Drivers 22, 28 and 34 provide output signals for each of the segments of the digits in the display, each of the outputs of the drivers being capable of carrying thereon a signal of one polarity or another, in accordance with the desired function of the particular segment to be controlled thereby.

Figure 3:
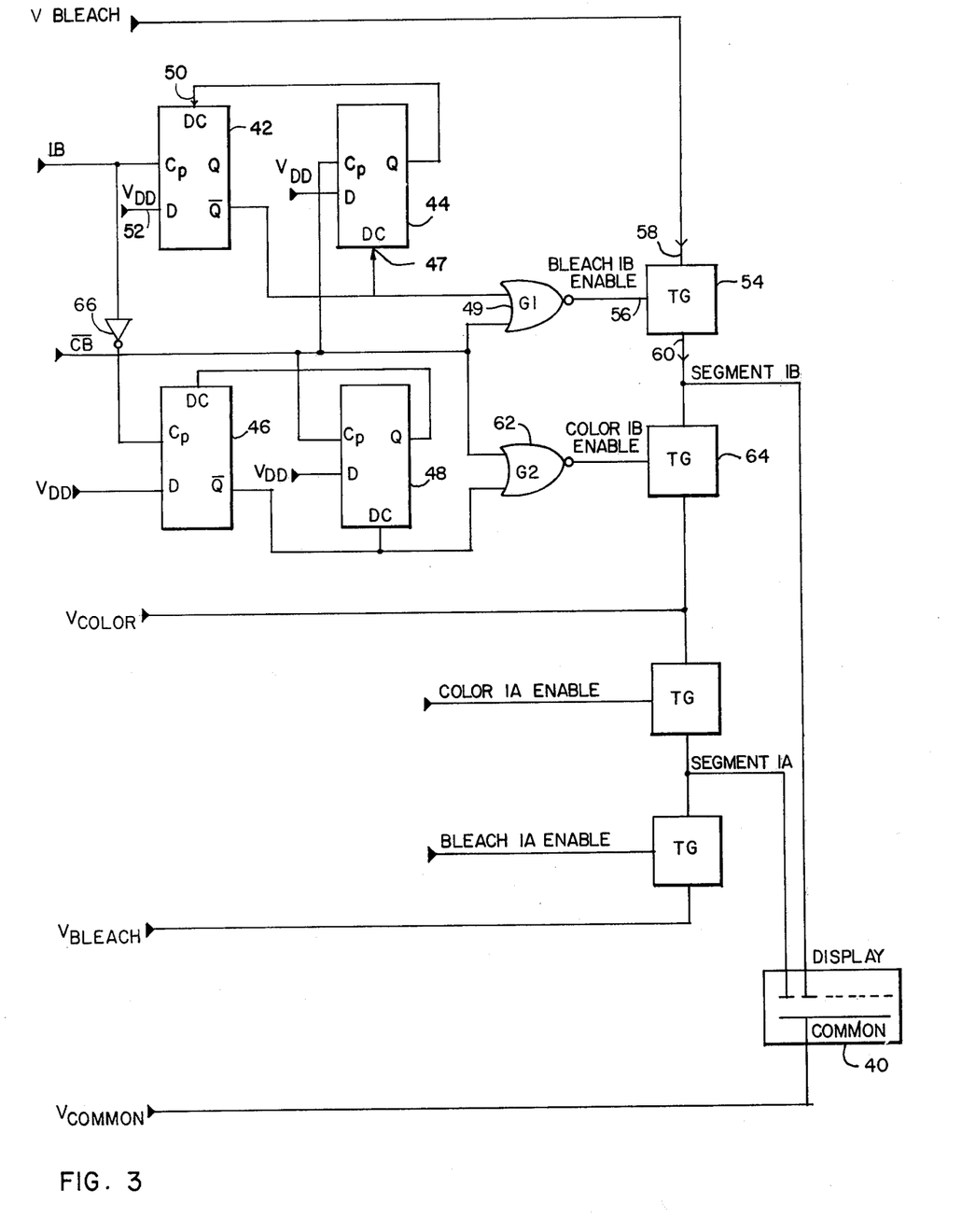
FIG. 3 shows a portion of the system of FIG. 2 which incorporates part of the present invention.

Referring now to FIG. 3, a portion of the digit drivers is shown comprising part of the inventive concept disclosed herein. Specifically, circuitry is shown for responding to a particular segment decoder output signal, and to a control signal, to provide the necessary driving voltage of the proper polarity for the segment of the particular digits to be displayed. The circuitry further provides for substantially simultaneous activation of either bleach or color signals for any of the segments of a particular digit.

As shown in the figure, a particular display digit 40, representing, for example, digit 1 of the display, has several segments therein. Specifically, segments a and b are shown as receiving the drive signals labeled segment $1a$ and segment $1b$. Only the circuitry for providing the drive signal for segment $1b$ is shown, it being understood that the circuits for driving the remaining segments in the digit, including segment $1a$ and additional segments not shown, are substantially identical to the driver for segment $1b$.

The circuit comprises four flip-flops, 42, 44, 46 and 48. The flip-flops are contemplated as being of the D type, but other types, such as a J-K or an R-S flip-flop may similarly be used with slight modifications of the remaining circuitry. Flip-flop 42 receives at its toggling input $C_p$ an output from segment decoder 20 for digit 1. The particular input shown is labeled $1b$ and represents segment b of digit 1, as previously disclosed. The coding convention used herein is to provide a logic 1 signal to indicate that a particular segment is to be bleached, and a logic zero to provide indication that the particular segment is to be colored. While the present circuitry contemplates the use of that specific code in positive logic, variations thereof are similarly applicable as is known to those of ordinary skill in the art. The $\overline{Q}$ output of flip-flop 42 is connected to the direct clear input 47 of flip-flop 44 and to an input of NOR gate 49. The Q output of flip-flop 4 is connected to the direct clear input 50 of flip-flop 42. The second input of NOR gate 49 receives signal $\overline{CB}$ which is also connected to the toggle input of flip-flop 44. While FIG. 2 illustrates the CB signal 15 as being generated by divider chain 14, the signal may equally well be generated by minutes counter 18 or by other circuitry in accordance with principles known to those skilled in the art. The CB signal is used to determine how long a color or bleach pulse signal is to last. Each minute a pulse is generated to provide the changes in the minutes display corresponding to the change in the minutes counter. A typical pulse is of a duration less than one second. Decoder 20 is designed so that signal $1b$ is synchronized with the CB signal, such that when signal $1b$ goes up (has a positive transition) CB goes up, and $\overline{CB}$ goes down (has a negative transition). Accordingly, when $1b$ goes up, flip-flop 42 is toggled to provide the input to the D terminal 52 at the output Q terminal, and the complement thereof on the $\overline{Q}$ terminal 42. Thus, $\overline{Q}$ goes down, thereby providing a low input to NOR gate 49. As $\overline{CB}$ has also gone down, two low inputs are provided to gate 49, thereby providing a 1(high) output therefrom. Transmission gate 54, available, for example, from RCA under the designation CD 4016, responds to a high input at terminal 56 by connecting the input signal at terminal 58 to the output terminal 60. Thus, when NOR gate 49 provides a high output signal, transmission gate 54 transmits the bleach voltage signal to the segment $1b$ driveline. At the termination of the CB pulse, $\overline{CB}$ goes up, thereby performing two functions: first, NOR gate 49 is caused to provide a low output and tramsmission gate 54 opened thereby; second, the toggle input to flip-flop 44 is activated, thereby providing a high output on the Q terminal. The output is connected to the direct clear terminal 50 of flip-flop 42, thereby "resetting" the flip-flop at the end of the CB pulse. Consequently, when a bleach signal is received by the upper network comprising flip-flops 42 and 44, NOR gate 49 and transmission gate 54, a bleach pulse is provided on the segment $1b$ output line to the display segment $1b$. The pulse on the segment $1b$ driveline is of the same duration as the CB pulse. Simultaneously, the other segments of the particular digit are also activated during the CB pulse, since each segment has a driving circuit comprising flip-flops, NOR gates and transmission gates substantially similar to the circuitry hereinabove described. Therefore, the CB pulse synchronizes activation of the various circuits to provide synchronism of the driving bleach and color pulses.

The bottom portion of the drive circuit for segment $1b$, comprising flip-flops 46 and 48, NOR gate 62 and transmission gate 64 functions in much the same way as the upper portion of the circuit, but is used to transmit a color pulse to the segment $1b$ driveline. Thus, inverter 66 is used to invert the $1b$ signal output from decoder 20 and to provide the inverted form thereof as a toggle input to flip-flop 46. The $\overline{Q}$ output of flip-flop 46 is provided as one input to NOR gate 62, the other input being the $\overline{CB}$ input line. Thus, when the $1b$ signal is low, NOR gate 62 provides a high output signal in synchronism with the CB pulse. Transmission gate 64 thus causes the color signal indicated as a voltage $V_{color}$, to be transmitted to segment 1b via the driveline therefor. As in the bleach circuit, the termination of the CB pulse toggles flip-flop 48, thereby resetting flip-flop 46 and ultimately opening transmission gate 64. The circuit thus provides a color or a bleach voltage pulse to segment 1b having a duration substantially the same as pulse CB regardless of the duration of the 1b bleach or color signal. Similarly, the various segments are provided a bleach or a color pulse substantially simultaneously inasmuch as the CB pulse signal is provided as an input to each driving circuit therefor.

A further feature of the color and bleach signal driving circuits shown in FIG. 3 is the protection provided to an electrochromic display by avoidance of a repeated drive signal to a particular segment. Specifically, unlike a liquid crystal display or a light emitting diode, an electrochromic display needs but one driving pulse to be colored, and but one pulse to be bleached. Once a segment is, indeed, colored, no further pulses need be provided thereto. Moreover, if additional pulses are provided to a segment, it may be damaged by being overdriven. The present invention thus prevents the system from energizing a particular segment twice consecutively in the same polarity, and does not provide two color pulses unless a bleach pulse has intervened. Similarly, two bleach pulses are not provided consecutively unless a color pulse has intervened. Conceivably, however, two consecutive bleach pulses may be desirable and may be provided.

This feature of the invention results from the interconnection of the flip-flops, where, as previously disclosed once the CB pulse goes down, a transmission gate is disabled. Thus, for example, assuming that transmission gate 64 had been enabled to pass a color pulse to display segment 1b, and that the CB pulse has gone down, thereby providing a high $\overline{CB}$ signal to NOR gate 62, the transmission gate 64 remains disabled as a result of the low output of NOR gate 62 until line 1b undergoes a change in state to a high value (indicating a bleach signal) and a subsequent drop to a low value to indicate the requirement of color. This follows from the flip-flop interconnection, inasmuch as flip-flop 46 is reset by flip-flop 48 when the $\overline{CB}$ signal goes up. As long as the 1b signal remains low, no positive transition is provided through inverter 66 to the $C_P$ input thereof. Accordingly, the $\overline{Q}$ output of flip-flop 46 remains high, and NOR gate 62 provides a low output regardless of the number of intervening $\overline{CB}$ pulses. Thus, once segment 1b has received a color pulse, no further color pulses are transmitted thereto if it needs to remain colored. This avoids overdriving the segment thereby adversely affecting its performance. If, at any time, signal 1b goes up, indicating that segment 1b is to be bleached, then, as previously discussed, a bleach pulse will be transmitted over the driveline for segment 1b. In a subsequent situation requiring the coloration of segment 1b, line 1b goes down and the output of inverter 66 provides the positive transition to flip-flop 46, thereby dropping the $\overline{Q}$ output and providing a high output from gate 62 as when the $\overline{CB}$ line drops. Similarly, two successive bleach pulses will not be provided to the segment without an intervening color pulse, by the similar connection of the bleach circuit.

Figure 4:
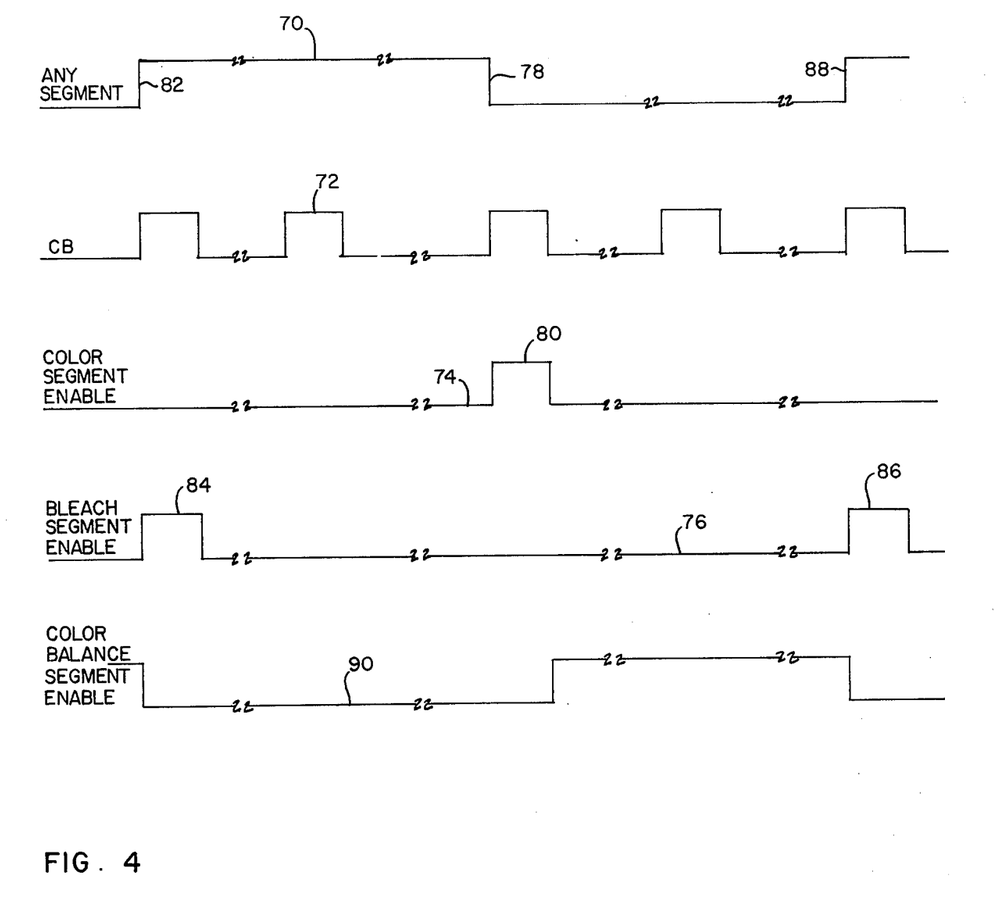
FIG. 4 is a timing diagram describing the operation of the present invention.

Accordingly, the above-described circuit prevents the successive application of pulses of the same polarity to any particular segment, and insures the proper functioning of the display. Similarly, the circuit provides for synchronization of the bleach and color pulses to the various display segments in a digit. Moreover, where the CB pulse is simultaneously provided to the several digits of a display, the circuit assures the simultaneous transition of all segments of all the digits for a pleasing visual effect to an operator. Referring now to FIG. 4, the waveforms descriptive of the operation of FIG. 3 are shown, thereby clarifying the above-described operation. Specifically, the waveform 70 illustrates a signal as might be applied to any particular segment, such as segment 1b, for example. The transitions are shown to be synchronized with transitions of the $\underline{CB}$ pulses shown in waveform 72. Not shown are the $\overline{CB}$ pulses which are identical with but of opposite polarity to the CB pulses. The color segment enable signal shown at 74 represents the output of NOR gate 62, while bleach segment enable signal 76 is the output of NOR gate 49.

As previously described, when a particular segment, such as segment 1b, receives a signal indicating a transition from bleach to color, as shown at transition 78 of the segment signal 70, a color segment enable pulse, shown at 80 in waveform 74 is output by gate 62. The pulse is synchronized with the CB pulse and lasts for the duration of one CB pulse. At the termination of the CB pulse, the color segment enable signal remains low, regardless of the number of intervening CB pulses. A further color segment enable pulse will not recur until the occurrence of an intervening bleach segment enable pulse. Similarly, when a segment signal undergoes a transition such as 82 of waveform 70, requiring a bleach of a segment, a bleach segment enable pulse 84 is generated and has the duration of a single CB pulse. At the termination of the CB pulse, the bleach segment enable signal goes down and remains down regardless of the fact that the segment signal is high, requiring a bleach. Several CB pulses may intervene, and when the decoder output signal undergoes a transition, producing color segment enable pulse 80, the bleach circuit is "primed" to produce a bleach segment enable pulse 86 responsive to the next positive transition 88 of signal 70.

Figure 5:
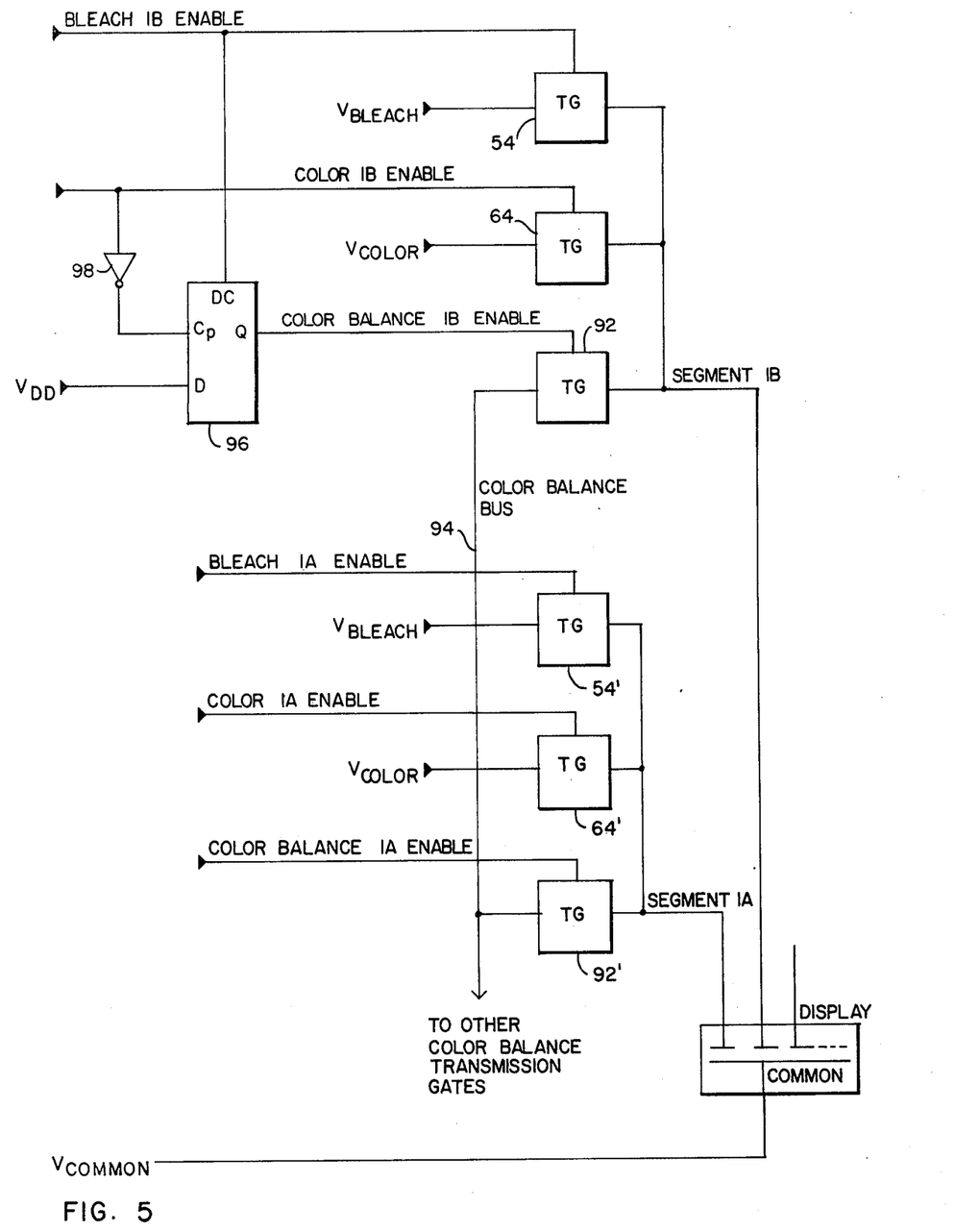
FIG. 5 shows an improvement of FIG. 3 incorporating therein yet another feature of the present invention.

Color balance segment enable signal 90 is described infra in conjunction with the circuit of FIG. 5.

The circuit shown in FIG. 5 is utilized to minimize irregularities in the contrast and/or optical densities of the several colored segments of a particular display digit by connecting all segments that have been colored to a common bus, thus providing the same potential across each. An electrochromic display can be thought of as a battery. There is a voltage across the display, which is dependent on the color state. As the color state varies, so, too, does this voltage. In a display with a common electrode and three different segments, for example, these three segments might have completely different impedances. If the same voltage is applied to each, the differing impedances will result in different currents being driven into each segment. The integrated current or charge (per unit area), determines the segments' color, or optical density. The segments therefore will have different optical densities. One would be light blue, the other would be medium blue and the third dark, for example. The simplest, most obvious way to overcome the problem would be to use a constant current for a constant time, thereby fixing the amount of charge provided to the segments. The present invention, however, views and solves the problem from another perspective. Because an electrochromic display has an emf associated with it, depending on the quantity of charge, once the three segments have been colored they are tied together to a bus bar. The segments will thus all come to the same potential relative to the common electrode. If the electrochromic film on each of the segments is of the same thickness, and the segments are all at the same potential, they have the same charge density per unit area, and hence will all have the same optical density.

FIG. 5 shows an implementation of the above-described concept. Transmission gates 54 and 64, described in conjunction with the operation of FIG. 3, are shown as supplying to the driveline for segment 1b either a bleach or a color pulse. Once a color pulse has been provided to the particular segment, however, and once transmission gates 54 and 64 are disabled, gate 92 is enabled, thereby connecting the driveline for segment 1b to a common bus 94, which is also shown connected to transmission gate 92' for the driveline of segment 1a. Segment 1a, similarly to segment 1b, has transmission gates 54' and 64' to provide the bleach and color pulses thereto. Transmission gate 92 is driven by color balance enable signal having the waveform shown at 90 in FIG. 4. The color balance enable signal, as shown at 90, provides a pulse having a rising edge coincident with the trailing edge of the color segment enable, thereby to avoid shorting a color pulse to the bus 94. Similarly, the trailing edge is synchronized with the leading edge of the bleach segment enable, thereby removing the common color signal when a bleach pulse is provided to the segment.

The color balance enable signal is generated by flip-flop 96, receiving at its togggle input an inverted color enable signal. The color enable signal 74 is provided to flip-flop 96 by an inverter 98. Thus, any negative transition of the color enable pulse provides a high Q output from flip-flop 96 and activates gate 92. Similarly, the high transition of bleach enable signal 76 is connected to the direct clear input of flip-flop 96, thereby resetting the flip-flop and closing gate 92.

The above-described circuit thus assures that all display segments of a particular digit are connected to a common bus, and are at a common potential, thus providing a uniform optical density, color, or contrast, without requiring uniform, high precision, constant current or voltage drives.

Thus, without requiring any additional drives, constancy of display density is assured. The bus, of course, may be common to the several digits of a display in order to provide uniformity of contrast throughout the digits.

Figure 6:
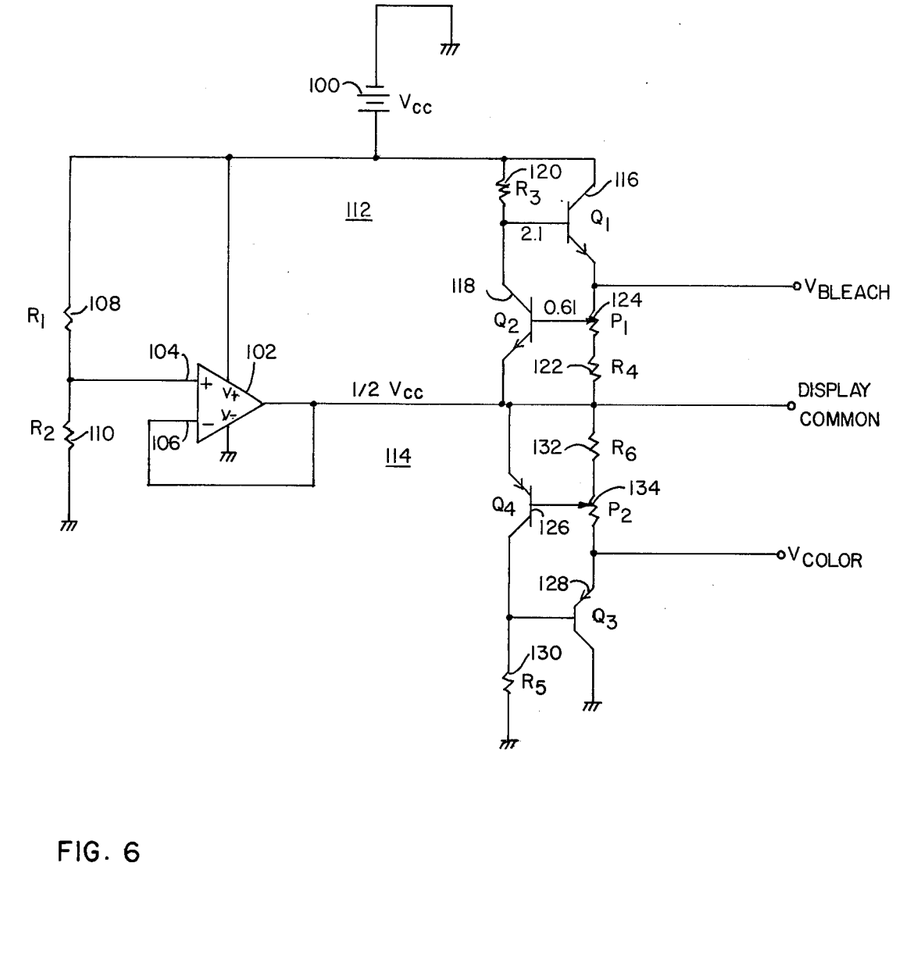
FIGS. 6, 7 and 8 show several embodiments of yet another feature of the present invention.
Figure 7:
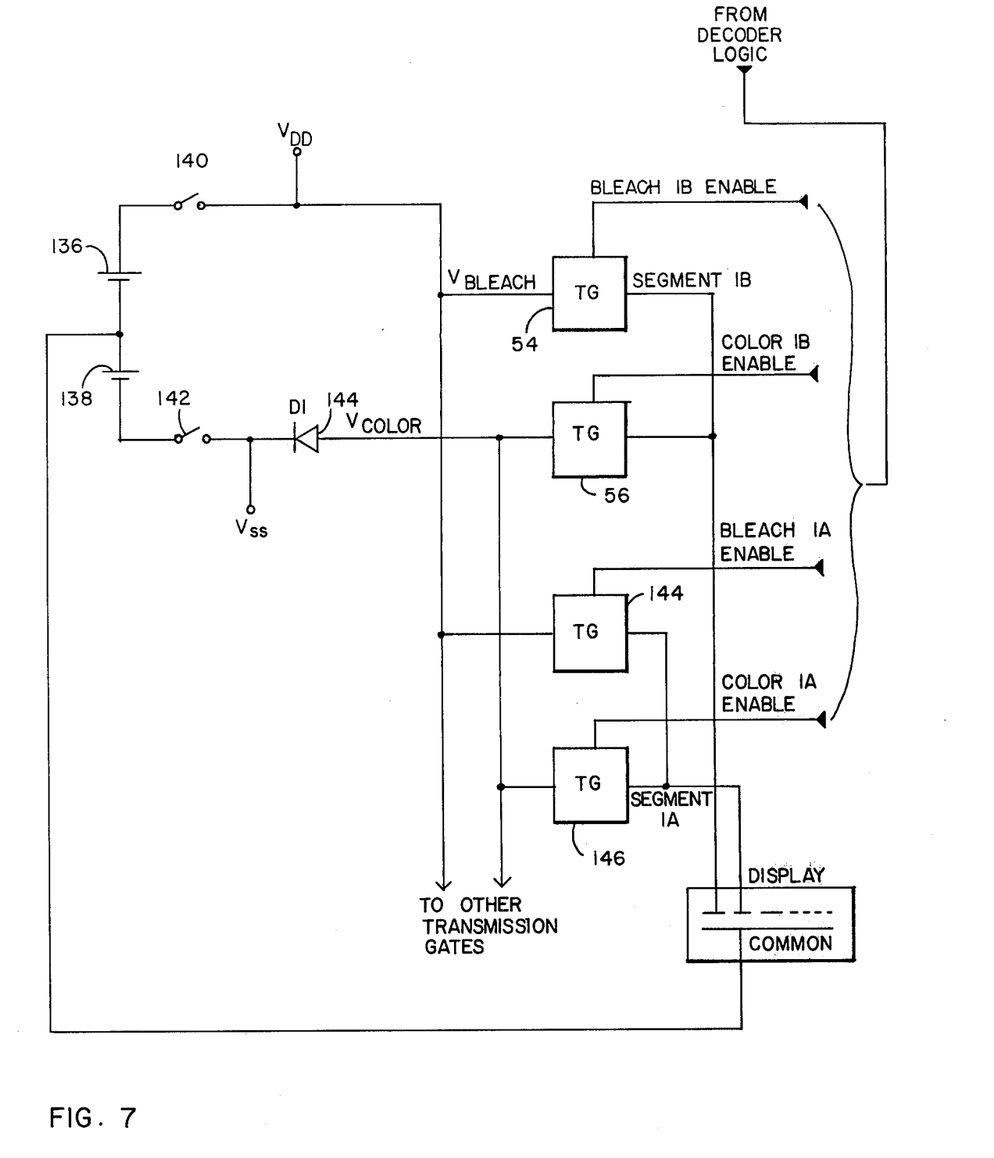
Figure 8:
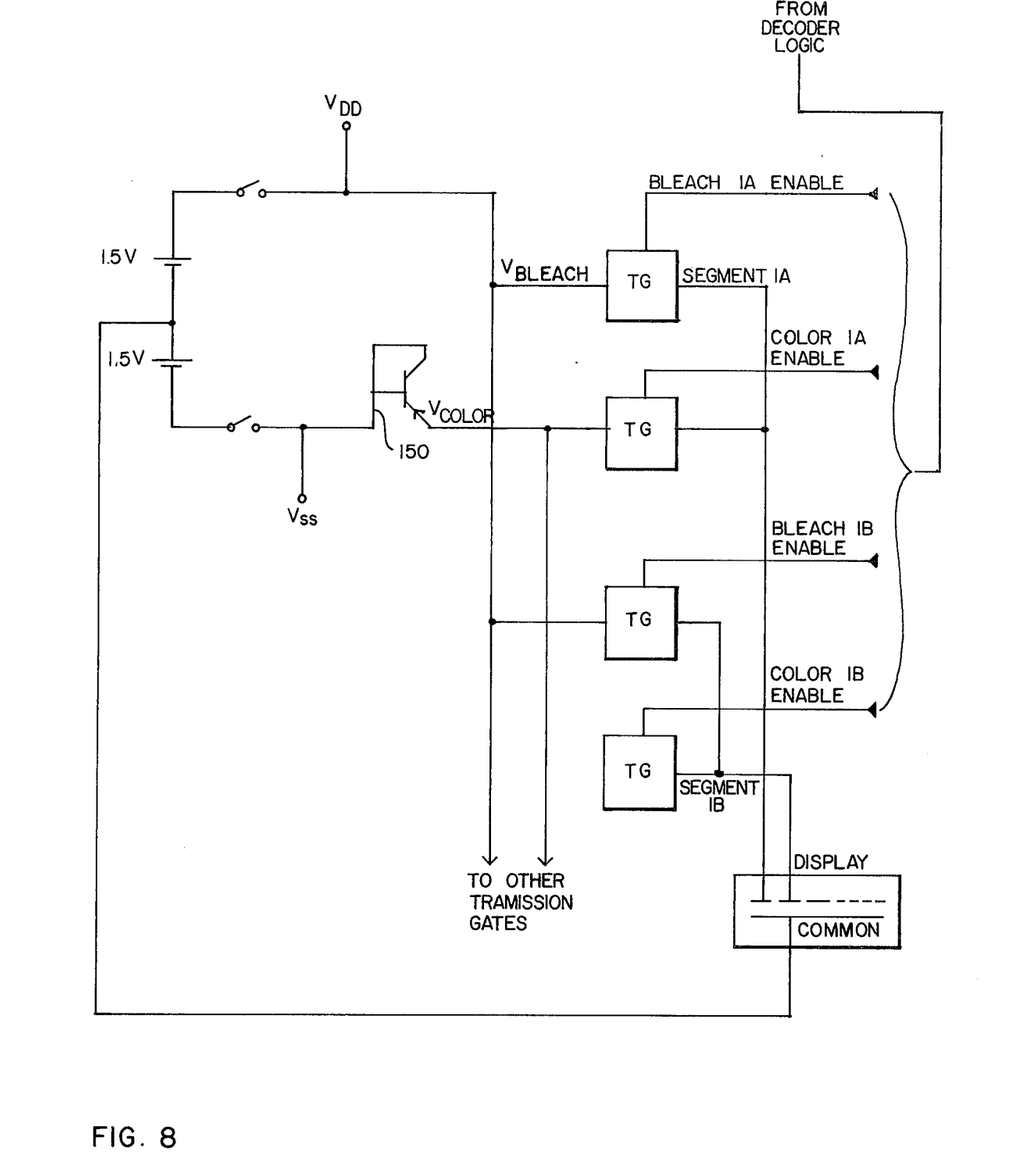

Referring now to FIGS. 6, 7 and 8, revealing three alternative embodiments used to provide the dual polarity voltages for the electrochromic display, FIG. 6 shows a circuit for converting a unipolar power supply to the required bipolar supply for the ECD and its drivers. Specifically, a DC voltage source, shown illustratively but without limitation as battery 100, provides the unipolar supply. An operational amplifier 102, having a non-inverting input 104 and an inverting input 106, is connected as a high impedance buffer. A voltage divider network comprising resistors 108 and 110 provides a voltage to the non-inverting input 104 of the amplifier. The resistors 108 and 110 are usually chosen approximately equal to each other, in order to provide a voltage input at 104 which is approximately one-half of the voltage of battery 100. The output of the amplifier is connected to inverting input 106.

Two regulators 112 and 114 are shown as providing the output bleach and color voltages, the output of operational amplifier 102 being used as the common voltage for the display. The output voltages of the regulators are positive and negative with respect to the common voltage, thereby providing a bipolar output supply voltage.

Regulator 112 comprises transistors 116 and 118, along with resistors 120 and 122. Potentiometer 124 is optionally provided for voltage adjustments. Regulator 114 comprises transistors 126 and 128, along with resistors 130, 132, and optional potentiometer 134. The two regulators 112 and 114 function substantially identically, but are comprised of transistors of opposite polarity, and provide voltages of opposite polarities with respect to the common output voltage. Accordingly, operation of only one regulator, 112, will be described, the other regulator functioning substantially identically thereto.

Transistor 118 is used to control the base drive of transistor 116 through resistor 120. In essence, when transistor 118 is off, the entire current through resistor 120 is supplied to transistor 116 as the base current thereof. Thus, transistor 116 tends to turn more heavily on, thereby raising the voltage at the emitter thereof, the emitter voltage being taken as the output bleach voltage. Thus, having established some quiescent operating point, it is seen that if the emitter current of transistor 116 rises, thereby raising the output bleach voltage, the base voltage of transistor 118 also rises. Accordingly, transistor 118 conducts more heavily and tends to draw more of the current flowing through resistor 120, lowering the base current of transistor 116, and therefore the emitter current thereof. Thus, an upward deviation of the emitter current of transistor 116 and of the bleach voltage results in a tendency towards lowering that same emitter current by operation of the regulator. Similarly, if the emitter current of transistor 116 drops, the voltage applied to the base of transistor 118 similarly drops, thereby tending to turn transistor 118 off and drawing less current through resistor 120, thus raising the base voltage of transistor 116 and increasing the emitter current thereof.

The bleach voltage and the color voltage are thus regulated by the circuit at 112 and 114, and provide stable output voltages, of positive and negative polarities, with respect to the common output terminal. Generally, the voltages tend towards a value approximately 0.6 volt above and below the common voltage level, and may be adjusted by potentiometers 124 and 134. Clearly, the voltage levels may be of different amplitudes.

It is thus seen that the circuit of FIG. 6 converts a single, unipolar supply (shown as a battery) to a bipolar supply providing two output voltages of opposite polarities and of differing magnitudes. This circuit provides the advantage of not requiring an externally regulated supply. Thus, voltage source 100 may swing over a wide range, without affecting the output voltages. Under some choices of component values, voltage 100 can vary from 3 to 36 volts without affecting the bleach and color output voltages, inasmuch as the common output voltage tends to track a value approximately equalling one-half of the value of supply 100, and the two output voltages are referenced to that value and are always regulated.

FIG. 7 illustrates a different supply source, utilizing two voltage sources 136 and 138. The common output voltage is taken from the junction of the two sources connected in series aiding, while the outputs from the two other terminals of the sources provide the bleach and color voltages. Optional switches 140 and 142 are shown and may be used in a test arrangement, but are not generally needed in a digital watch, for example. If sources 136 and 138 are chosen to be, for example, batteries having potentials thereacross of 1.5 volts each, a voltage drop in the color voltage supply may be provided to yield the desired drive voltage which may be 0.7 volts, for example. Accordingly, a dropping diode 144 is connected in the color voltage supply circuit to provide the proper reduction. Inasmuch as whenever a segment is in the color condition a current flows, the diode 144 will provide the required drop whenever any segment is required to be in the colored condition. As further shown in FIG. 7, gates 54 and 56, as described in conjunction with FIG. 3, receive a bleach and a color voltage, respectively, for transmission to segment 1b whenever the bleach enable or color enable lines, respectively, are high. The bleach voltage is similarly connected to transmission gate 144 and the color voltage connected to transmission gate 146 to provide the proper voltage level for segment 1a when the bleach enable or color enable voltages therefor are high. Similarly, other segments also receive the bleach and color voltages. FIG. 8 discloses a modification of FIG. 7 in the use of a transistor 150 for regulating the voltage drop in the color voltage. In operation, most of the color current flows through the collector of transistor 150 and not through its base. The small portion of the current flowing through the base keeps the emitter-to-base voltage drop steady, thereby keeping the color voltage at a steady level. The transistor is used to provide better voltage regulation with the varying current utilized in a multi-digit display. For example, in a standard three and one-half digit display, as contemplated in a digital watch, the current may vary on the order of seven to one, leading to a 20 percent change in voltage.

The preceding description, by way of illustration and not of limitation, discloses the application of the present invention to a digital watch utilizing an electrochromic display. The invention is applicable to any display utilizing electrochromic devices. Many variations of the disclosed embodiment will occur to those skilled in the art, and such variations are intended to be within the scope of the invention as defined by the appended claims.

We claim:

1. In an electrochromic display device having an indicator with an arrangement of a plurality of electrochromic display segments with common electrode means and a plurality of display segment electrodes respectively, adapted to be selectively driven to bleach and color display states with applied bleach and color drive signals respectively of opposite polarity relative to the common electrode means, and an indicator operating circuit having input means for receiving successive applied display select signals for selecting successive bleach and color display segment arrangements, and segment operating circuit means for selectively applying said bleach and color drive signals to the display segment electrodes in accordance with the selected arrangement of each display select signal applied to the input means, the improvement wherein the segment operating circuit means comprises redundancy control circuit means operable for preventing application of consecutive color drive signals to any segment electrode in accordance with consecutive display select signals.

2. A display device according to claim 1 wherein the redundancy control circuit means is also operable for preventing application of consecutive bleach drive signals to any segment electrode in accordance with consecutive display select signals.

3. A display device according to claim 1 wherein the segment operating circuit means further comprises a color balancing circuit for selectively electrically connecting the segment electrodes driven to the color state to establish a common segment electrode potential relative to the common electrode means for balancing the respective color displays.

4. A display device according to claim 1 wherein the redundancy control circuit means comprises a two-state drive control for each segment operable to first and second states thereof in conjunction with the application of bleach and color drive signals to the respective segment electrode, and connected to prevent application of a color drive signal to the respective segment electrode in its said second state.

5. A display device according to claim 4 wherein the two-state drive control is connected to prevent application of a bleach drive signal to the respective segment electrode in its said first state.

6. A display device according to claim 1 wherein the redundancy control circuit means comprises logic circuit means for preventing application of successive color drive signals to each segment electrode without an intervening bleach drive signal applied thereto.

7. A display device according to claim 6 wherein the logic circuit means is operable for preventing application of successive bleach drive signals to each segment electrode without an intervening color drive signal applied thereto.

8. In an electrochromic display device having an indicator with an arrangement of a plurality of electrochromic display segments with common electrode means and a plurality of display segment electrodes respectively, adapted to be selectively driven to bleach and color display states with applied bleach and color drive signals respectively of opposite polarity relative to the common electrode means, and an indicator operating circuit having input means for receiving successive applied display select signals for selecting successive bleach and color display segment arrangements, and segment operating circuit means for selectively applying said bleach and color drive signals to the display segment electrodes in accordance with the selected arrangement of each display select signal applied to the input means, the improvement wherein the segment operating circuit means comprises a color balancing circuit for selectively electrically connecting the segment electrodes driven to the color state to establish a common segment electrode potential relative to the common electrode means for balancing the respective color displays.

9. A display device according to claim 8 wherein the segment operating circuit means comprises synchronizing means for applying color drive signals to the selected segment electrodes for a predetermined interval and connected to the color balancing circuit for connecting the segment electrodes driven to the color state at the completion of said predetermined interval.

10. In a method of successively operating an electrochromic display device having an arrangement of a plurality of electrochromic display segments with common electrode means and a plurality of display segment electrodes respecitvely, adapted to be selectively driven to bleach and color display states with applied bleach and color drive signals respectively of opposite polarity relative to the common electrode means, with successive display select signals establishing successive bleach and color display segment arrangements, comprising the step, for each successive display select signal, of selectively applying said bleach and color drive signals to the display segment electrodes in accordance with the arrangement established by the respective display select signal, the improvement wherein the step of selectively applying the bleach and color drive signals comprises applying a color drive signal only to the segment electrodes of the bleach segments of the preceding display select signal arrangement.

11. In a method of successively operating an electrochromic display device having an arrangement of a plurality of electrochromic display segments with common electrode means and a plurality of display segment electrodes respectively, adapted to be selectively driven to bleach and color display states with applied bleach and color drive signals respectively of opposite polarity relative to the common electrode means, with successive display select signals establishing successive bleach and color display segment arrangements, comprising the step, for each successive display select signal, of selectively applying said bleach and color drive signals to the display segment electrodes in accordance with the arrangement established by the respective display select signal, the improvement wherein the method further comprises the step, for each successive display select signal, of interconnecting the segment electrodes of the color segments of the respective display select signal arrangment to provide a common color segment electrode potential relative to the common electrode means for balancing the respective color displays.

* * * * *